(12) United States Patent
Yang et al.

(10) Patent No.: US 11,627,026 B2
(45) Date of Patent: Apr. 11, 2023

(54) METHOD AND DEVICE FOR TRANSMITTING/RECEIVING WIRELESS SIGNAL IN WIRELESS COMMUNICATION SYSTEM

(71) Applicant: LG ELECTRONICS INC., Seoul (KR)

(72) Inventors: Suckchel Yang, Seoul (KR); Joonkui Ahn, Seoul (KR); Kijun Kim, Seoul (KR); Hyunsoo Ko, Seoul (KR); Eunsun Kim, Seoul (KR); Seonwook Kim, Seoul (KR); Daesung Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/315,251

(22) PCT Filed: Jul. 7, 2017

(86) PCT No.: PCT/KR2017/007340
§ 371 (c)(1),
(2) Date: Jan. 4, 2019

(87) PCT Pub. No.: WO2018/009046
PCT Pub. Date: Jan. 11, 2018

(65) Prior Publication Data
US 2019/0165876 A1    May 30, 2019

Related U.S. Application Data

(60) Provisional application No. 62/359,218, filed on Jul. 7, 2016.

(51) Int. Cl.
*H04L 12/00*    (2006.01)
*H04L 27/26*    (2006.01)
(Continued)

(52) U.S. Cl.
CPC ...... *H04L 27/2613* (2013.01); *H04J 13/0062* (2013.01); *H04L 5/00* (2013.01); *H04L 5/0048* (2013.01); *H04L 5/0051* (2013.01)

(58) Field of Classification Search
None
See application file for complete search history.

(56) References Cited

U.S. PATENT DOCUMENTS

2010/0296465 A1    11/2010   Hooli et al.
2011/0134849 A1*    6/2011   Lee .................... H04B 7/0613
                                                                     370/328
(Continued)

FOREIGN PATENT DOCUMENTS

WO       2016048597 A1     3/2016

OTHER PUBLICATIONS

CATT, "Design of sPUSCH DMRS", 3GPP TSG RAN WG1 Meeting #85, May 23-27, 2016, R1-164234.

*Primary Examiner* — Noel R Beharry
*Assistant Examiner* — Lionel Preval
(74) *Attorney, Agent, or Firm* — Dentons US LLP

(57) ABSTRACT

The present invention relates to a wireless communication system, and specifically, to a method and a device for the method which comprises the steps of: receiving resource allocation information for transmitting uplink data; generating a data demodulation reference signal (DMRS) sequence; and transmitting the data and the DMRS sequence on a frequency band indicated by the resource allocation information, wherein the frequency band comprises frequency resource units, and the DMRS sequence is generated for each frequency resource unit.

16 Claims, 12 Drawing Sheets

(51) Int. Cl.
*H04L 5/00* (2006.01)
*H04J 13/00* (2011.01)

(56) References Cited

U.S. PATENT DOCUMENTS

| | | | |
|---|---|---|---|
| 2011/0158191 A1* | 6/2011 | Zhang | H04L 5/003 370/329 |
| 2011/0206089 A1* | 8/2011 | Cho | H04W 72/042 375/141 |
| 2013/0114547 A1* | 5/2013 | Li | H04L 5/0051 370/329 |
| 2013/0114756 A1* | 5/2013 | Jia | H04J 11/00 375/295 |
| 2013/0301452 A1* | 11/2013 | Yoon | H04L 5/0012 370/252 |
| 2014/0301345 A1* | 10/2014 | Kim | H04L 27/2613 370/329 |
| 2014/0355710 A1* | 12/2014 | Takata | H04B 7/0452 375/267 |
| 2014/0376356 A1* | 12/2014 | Park | H04W 72/0413 370/203 |
| 2015/0043465 A1* | 2/2015 | Ouchi | H04W 28/16 370/329 |
| 2015/0163030 A1 | 6/2015 | Papasakellariou et al. | |
| 2015/0230211 A1 | 8/2015 | You et al. | |
| 2016/0006548 A1 | 1/2016 | Yang et al. | |
| 2016/0112994 A1 | 4/2016 | Wang et al. | |
| 2016/0337157 A1* | 11/2016 | Papasakellariou | H04B 3/232 |
| 2017/0366377 A1* | 12/2017 | Papasakellariou | H04L 5/0053 |
| 2018/0316469 A1* | 11/2018 | Jiang | H04W 72/042 |

* cited by examiner

PUCCH format 1a and 1b structure (normal CP case)

FIG. 13
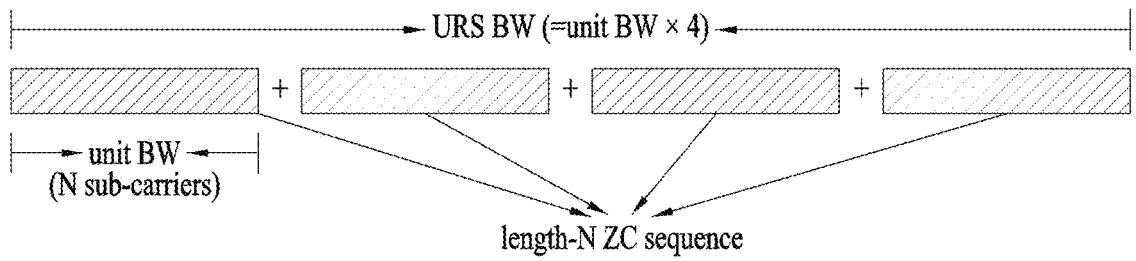
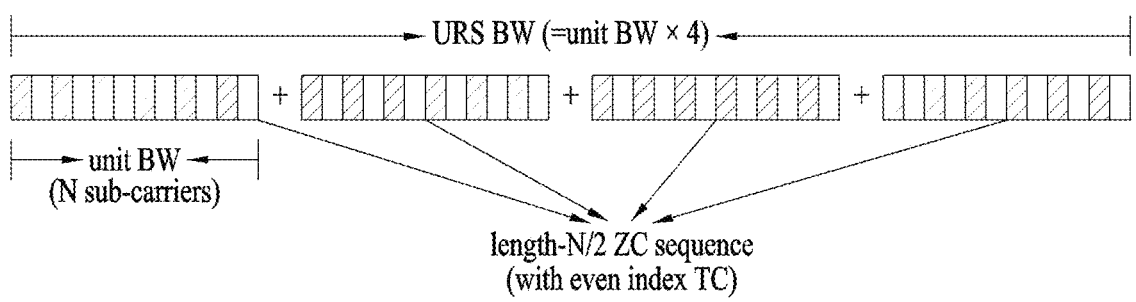
FIG. 14
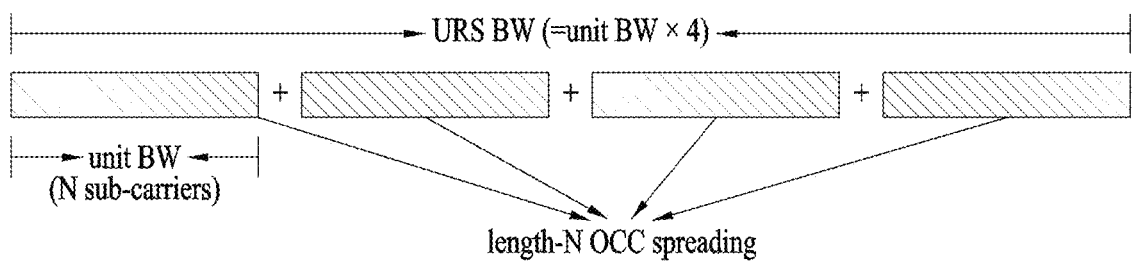
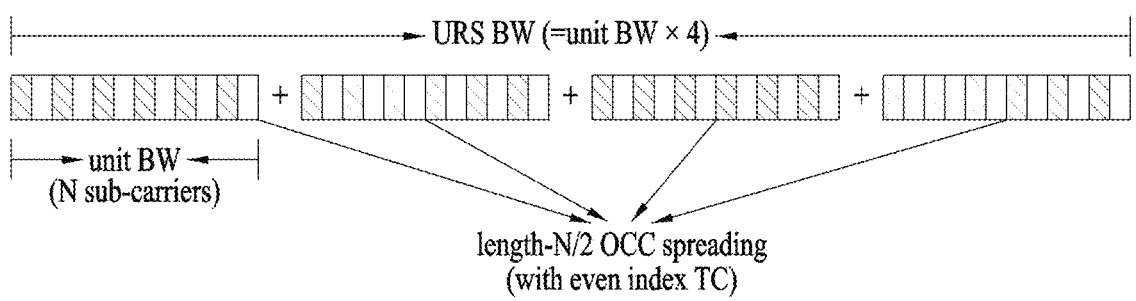

METHOD AND DEVICE FOR TRANSMITTING/RECEIVING WIRELESS SIGNAL IN WIRELESS COMMUNICATION SYSTEM

This application is a National Stage Application of International Application No. PCT/KR2017/007340, filed on Jul. 7, 2017, which claims the benefit of U.S. Provisional Application No. 62/359,218, filed on Jul. 7, 2016, all of which are hereby incorporated by reference in their entirety for all purposes as if fully set forth herein.

TECHNICAL FIELD

The present invention relates to a wireless communication system, and more particularly, to a method and device for transmitting/receiving a wireless signal. The wireless communication system includes a CA-based (Carrier Aggregation-based) wireless communication system.

BACKGROUND ART

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may include one of CDMA (code division multiple access) system, FDMA (frequency division multiple access) system, TDMA (time division multiple access) system, OFDMA (orthogonal frequency division multiple access) system, SC-FDMA (single carrier frequency division multiple access) system and the like.

DISCLOSURE

Technical Problem

An object of the present invention is to provide a method of efficiently transmitting/receiving control information in a wireless communication and an apparatus therefor.

Technical tasks obtainable from the present invention are non-limited the above-mentioned technical task. And, other unmentioned technical tasks can be clearly understood from the following description by those having ordinary skill in the technical field to which the present invention pertains.

Technical Solution

In one aspect of the present invention, a method for transmitting an uplink signal from a user equipment (UE) in a wireless communication system comprises the steps of: receiving resource allocation information for transmission of uplink data; generating a data demodulation reference signal (DMRS) sequence; and transmitting the data and the DMRS sequence on a frequency band indicated by the resource allocation information, wherein the frequency band includes frequency resource units, and the DMRS sequence is generated for each frequency resource unit.

In another aspect of the present invention, a user equipment (UE) used in a wireless communication system comprises a radio frequency (RF) module; and a processor, wherein the processor receives resource allocation information for transmission of uplink data, generates a data demodulation reference signal (DMRS) sequence, and transmits the data and the DMRS sequence on a frequency band indicated by the resource allocation information, and the frequency band includes frequency resource units, and the DMRS sequence is generated for each frequency resource unit.

Preferably, the DMRS sequence may be mapped into subcarriers spaced apart from each other at constant intervals on a corresponding frequency resource unit.

Preferably, the DMRS sequence may include a Zaddoff-Chu (ZC) sequence or a Constant Amplitude Zero Auto Correlation (CAZAC) sequence.

Preferably, a cyclic shift (CS) value of the DMRS sequence transmitted on each frequency resource unit may be determined in accordance with an index of a corresponding frequency resource unit.

Preferably, a cyclic shift (CS) value of the DMRS sequence transmitted on each frequency resource unit may be set equally in all frequency resource units within the frequency band.

Preferably, a cyclic shift (CS) value of the DMRS sequence transmitted on each frequency resource unit may be determined in accordance with an index of an antenna port through which a corresponding DMRS sequence is transmitted.

Preferably, the wireless communication system may include a 3rd Generation Project Partnership Long Term Evolution (3GPP LTE)-based wireless communication system.

Advantageous Effects

According to the present invention, wireless signal transmission and reception can be efficiently performed in a wireless communication system.

Effects obtainable from the present invention may be non-limited by the above mentioned effect. And, other unmentioned effects can be clearly understood from the following description by those having ordinary skill in the technical field to which the present invention pertains.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

FIGS. 13 to 14 illustrate signal transmission procedure according to the present invention.

BEST MODE FOR CARRYING OUT THE INVENTION

Embodiments of the present invention are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3rd Generation Partnership Project (3GPP) Long Term Evolution (LTE) is a part of Evolved UMTS (E-UMTS) using E-UTRA, employing OFDMA for downlink and SC-FDMA for uplink. LTE-Advanced (LTE-A) evolves from 3GPP LTE. While the following description is given, centering on 3GPP LTE/LTE-A for clarity, this is purely exemplary and thus should not be construed as limiting the present invention.

In a wireless communication system, a user equipment (UE) receives information through downlink (DL) from a base station (BS) and transmit information to the BS through uplink (UL). The information transmitted and received by the BS and the UE includes data and various control information and includes various physical channels according to type/usage of the information transmitted and received by the UE and the BS.

Figure 1:
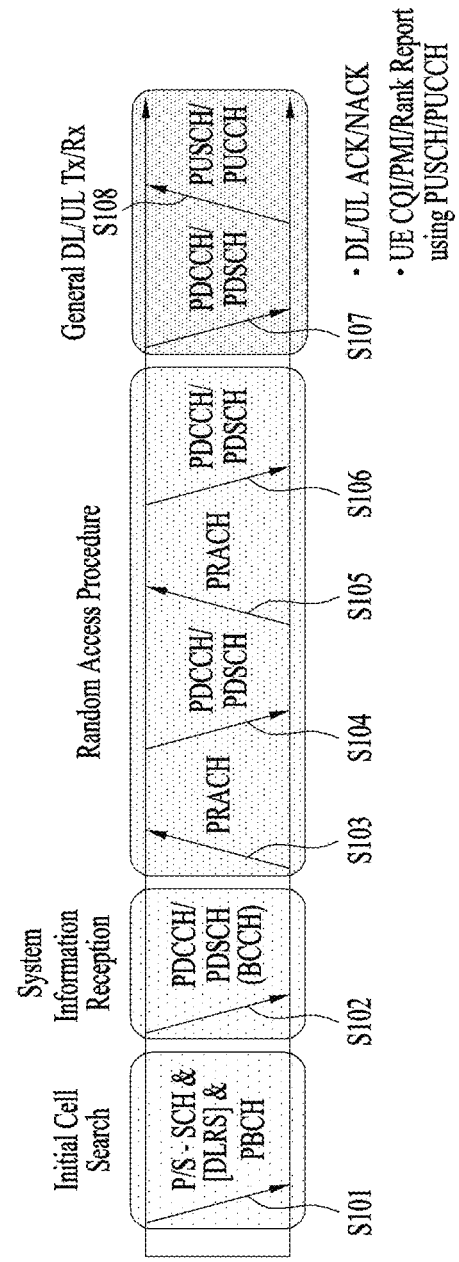
FIG. 1 illustrates physical channels used in 3GPP LTE(-A) and a signal transmission method using the same.

FIG. 1 illustrates physical channels used in 3GPP LTE(-A) and a signal transmission method using the same.

When powered on or when a UE initially enters a cell, the UE performs initial cell search involving synchronization with a BS in step S101. For initial cell search, the UE synchronizes with the BS and acquire information such as a cell Identifier (ID) by receiving a primary synchronization channel (P-SCH) and a secondary synchronization channel (S-SCH) from the BS. Then the UE may receive broadcast information from the cell on a physical broadcast channel (PBCH). In the meantime, the UE may check a downlink channel status by receiving a downlink reference signal (DL RS) during initial cell search.

After initial cell search, the UE may acquire more specific system information by receiving a physical downlink control channel (PDCCH) and receiving a physical downlink shared channel (PDSCH) based on information of the PDCCH in step S102.

The UE may perform a random access procedure to access the BS in steps S103 to S106. For random access, the UE may transmit a preamble to the BS on a physical random access channel (PRACH) (S103) and receive a response message for preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a physical uplink shared channel (PUSCH)/physical uplink control channel (PUCCH) (S108), as a general downlink/uplink signal transmission procedure. Control information transmitted from the UE to the BS is referred to as uplink control information (UCI). The UCI includes hybrid automatic repeat and request acknowledgement/negative-acknowledgement (HARQ-ACK/NACK), scheduling request (SR), channel state information (CSI), etc. The CSI includes a channel quality indicator (CQI), a precoding matrix indicator (PMI), a rank indicator (RI), etc. While the UCI is transmitted on a PUCCH in general, the UCI may be transmitted on a PUSCH when control information and traffic data need to be simultaneously transmitted. In addition, the UCI may be aperiodically transmitted through a PUSCH according to request/command of a network.

Figure 2:
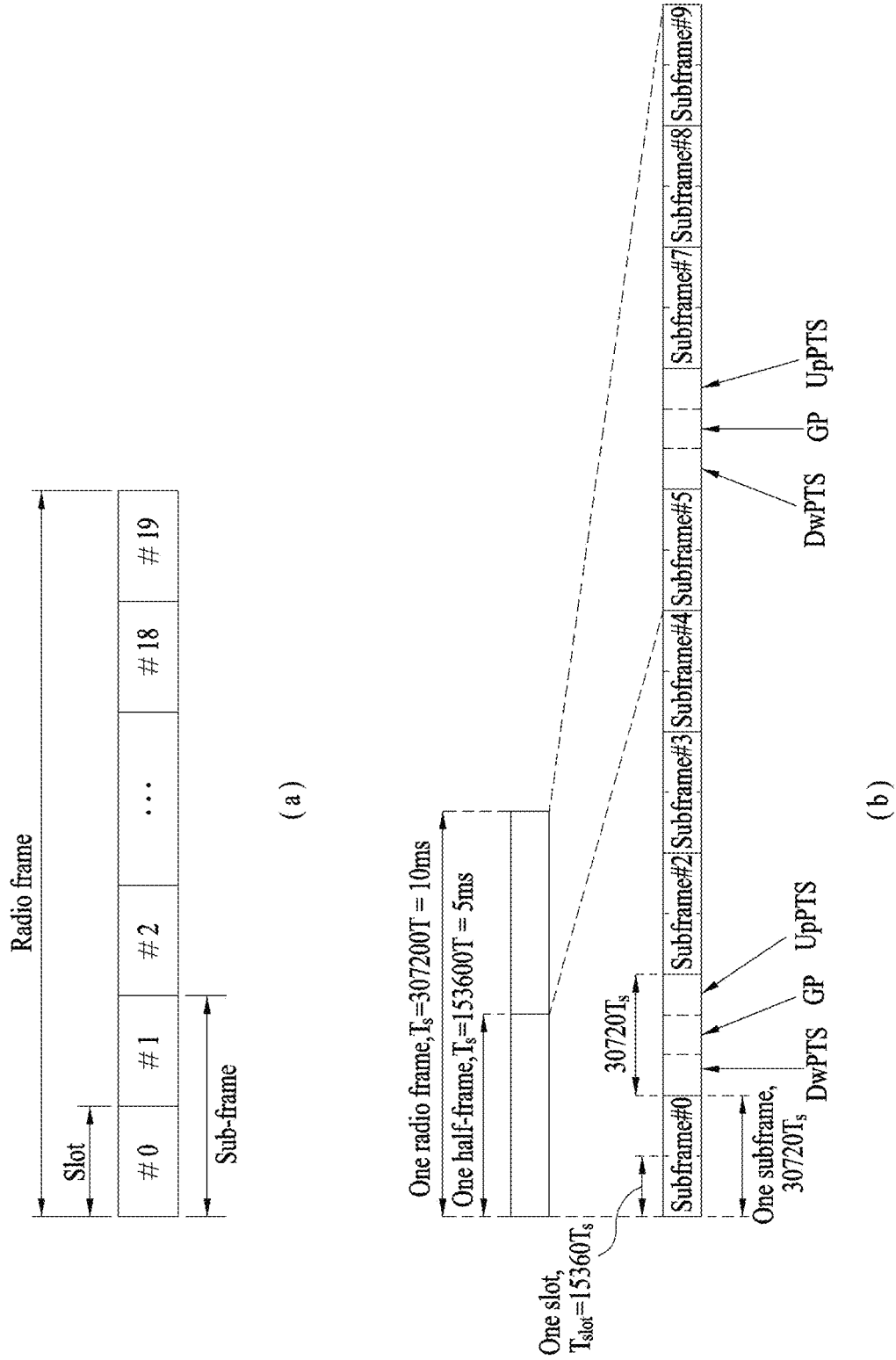
FIG. 2 illustrates a radio frame structure.

FIG. 2 illustrates a radio frame structure. Uplink/downlink data packet transmission is performed on a subframe-by-subframe basis. A subframe is defined as a predetermined time interval including a plurality of symbols. 3GPP LTE supports a type-1 radio frame structure applicable to frequency division duplex (FDD) and a type-2 radio frame structure applicable to time division duplex (TDD).

FIG. 2(a) illustrates a type-1 radio frame structure. A downlink subframe includes 10 subframes each of which includes 2 slots in the time domain. A time for transmitting a subframe is defined as a transmission time interval (TTI). For example, each subframe has a duration of 1 ms and each slot has a duration of 0.5 ms. A slot includes a plurality of OFDM symbols in the time domain and includes a plurality of resource blocks (RBs) in the frequency domain. Since downlink uses OFDM in 3GPP LTE, an OFDM symbol represents a symbol period. The OFDM symbol may be called an SC-FDMA symbol or symbol period. An RB as a resource allocation unit may include a plurality of consecutive subcarriers in one slot.

The number of OFDM symbols included in one slot may depend on cyclic prefix (CP) configuration. CPs include an extended CP and a normal CP. When an OFDM symbol is configured with the normal CP, for example, the number of OFDM symbols included in one slot may be 7. When an OFDM symbol is configured with the extended CP, the length of one OFDM symbol increases, and thus the number of OFDM symbols included in one slot is smaller than that in case of the normal CP. In case of the extended CP, the number of OFDM symbols allocated to one slot may be 6. When a channel state is unstable, such as a case in which a UE moves at a high speed, the extended CP can be used to reduce inter-symbol interference.

When the normal CP is used, one subframe includes 14 OFDM symbols since one slot has 7 OFDM symbols. The first three OFDM symbols at most in each subframe can be allocated to a PDCCH and the remaining OFDM symbols can be allocated to a PDSCH.

FIG. 2(b) illustrates a type-2 radio frame structure. The type-2 radio frame includes 2 half frames. Each half frame includes 4(5) normal subframes and 10 special subframes. The normal subframes are used for uplink or downlink according to UL-DL configuration. A subframe is composed of 2 slots.

Table 1 shows subframe configurations in a radio frame according to UL-DL configurations.

TABLE 1

| Uplink-downlink configuration | Downlink-to-Uplink Switch point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes DwPTS (Downlink Pilot TimeSlot), GP (Guard Period), and UpPTS (Uplink Pilot TimeSlot). DwPTS is used for initial cell search, synchronization or channel estimation in a UE and UpPTS is used for channel estimation in a BS and uplink transmission synchronization in a UE. The GP eliminates UL interference caused by multi-path delay of a DL signal between a UL and a DL.

The radio frame structure is merely exemplary and the number of subframes included in the radio frame, the number of slots included in a subframe, and the number of symbols included in a slot can be vary.

Figure 3:
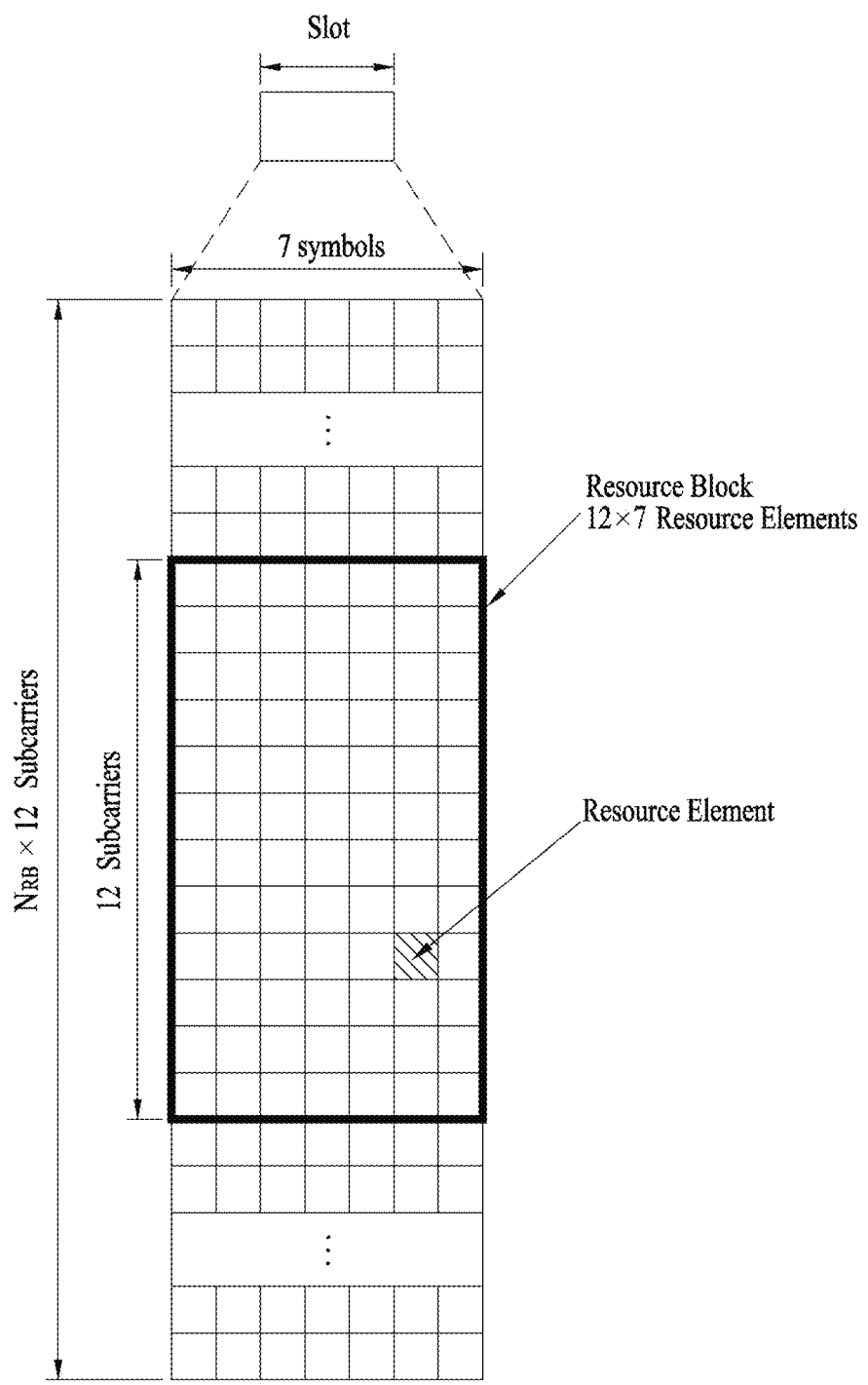
FIG. 3 illustrates a resource grid of a downlink slot.

FIG. 3 illustrates a resource grid of a downlink slot.

Referring to FIG. 3, a downlink slot includes a plurality of OFDM symbols in the time domain. While one downlink slot may include 7 OFDM symbols and one resource block (RB) may include 12 subcarriers in the frequency domain in the figure, the present invention is not limited thereto. Each element on the resource grid is referred to as a resource element (RE). One RB includes 12×7 REs. The number NRB of RBs included in the downlink slot depends on a downlink transmit bandwidth. The structure of an uplink slot may be same as that of the downlink slot.

Figure 4:
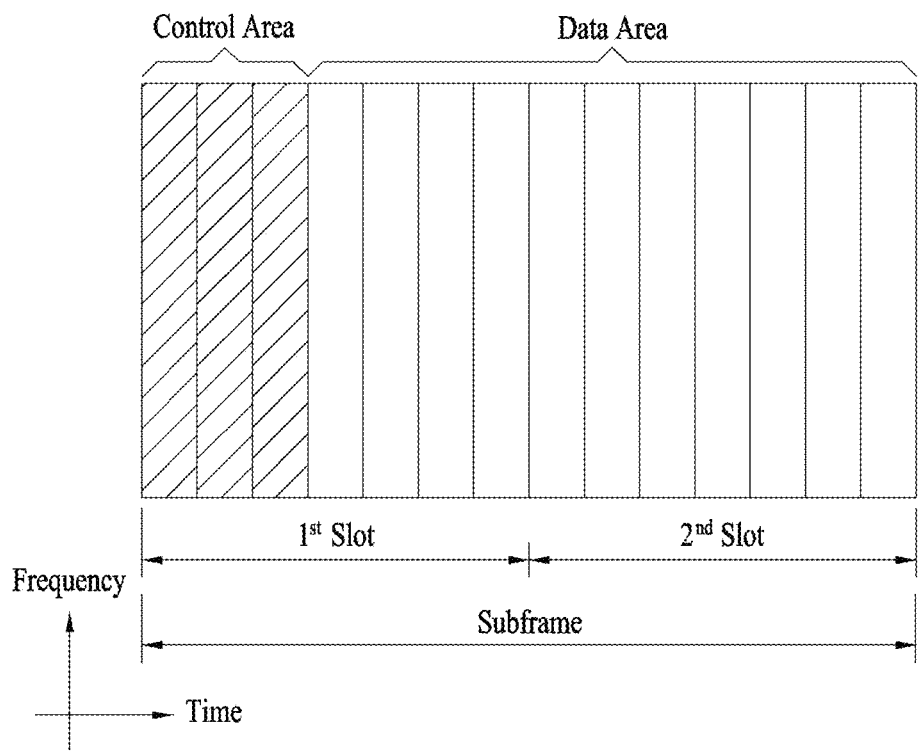
FIG. 4 illustrates a downlink subframe structure.

FIG. 4 illustrates a downlink subframe structure.

Referring to FIG. 4, a maximum of three (four) OFDM symbols located in a front portion of a first slot within a subframe correspond to a control region to which a control channel is allocated. The remaining OFDM symbols correspond to a data region to which a physical downlink shared chancel (PDSCH) is allocated. A basic resource unit of the data region is an RB. Examples of downlink control channels used in LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries a HARQ acknowledgment (ACK)/negative-acknowledgment (NACK) signal. Control information transmitted through the PDCCH is referred to as downlink control information (DCI). The DCI includes uplink or downlink scheduling information or an uplink transmit power control command for an arbitrary UE group.

Control information transmitted through the PDCCH is referred to as downlink control information (DCI). Formats 0, 3, 3A and 4 for uplink and formats 1, 1A, 1B, 1C, 1D, 2, 2A, 2B and 2C for downlink are defined as DCI formats. Information field type, the number of information fields, the number of bits of each information field, etc. depend on DIC format. For example, the DCI formats selectively include information such as hopping flag, RB assignment, MCS (Modulation Coding Scheme), RV (Redundancy Version), NDI (New Data Indicator), TPC (Transmit Power Control), HARQ process number, PMI (Precoding Matrix Indicator) confirmation as necessary. Accordingly, the size of control information matched to a DCI format depends on the DCI format. An arbitrary DCI format may be used to transmit two or more types of control information. For example, DIC formats ORA is used to carry DCI format 0 or DIC format 1, which are discriminated from each other using a flag field.

A PDCCH may carry a transport format and a resource allocation of a downlink shared channel (DL-SCH), resource allocation information of an uplink shared channel (UL-SCH), paging information on a paging channel (PCH), system information on the DL-SCH, information on resource allocation of an upper-layer control message such as a random access response transmitted on the PDSCH, a set of Tx power control commands on individual UEs within an arbitrary UE group, a Tx power control command, information on activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). A format of the PDCCH and the number of bits of the available PDCCH are determined by the number of CCEs. The BS determines a PDCCH format according to DCI to be transmitted to the UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging identifier (e.g., paging-RNTI (P-RNTI)) may be masked to the CRC. If the PDCCH is for system information (more specifically, a system information block (SIB)), a system information RNTI (SI-RNTI) may be masked to the CRC. When the PDCCH is for a random access response, a random access-RNTI (RA-RNTI) may be masked to the CRC.

The PDCCH carries a message known as DCI which includes resource assignment information and other control information for a UE or UE group. In general, a plurality of PDCCHs can be transmitted in a subframe. Each PDCCH is transmitted using one or more CCEs. Each CCE corresponds to 9 sets of 4 REs. The 4 REs are referred to as an REG. 4 QPSK symbols are mapped to one REG. REs allocated to a reference signal are not included in an REG, and thus the total number of REGs in OFDM symbols depends on presence or absence of a cell-specific reference signal. The concept of REG (i.e. group based mapping, each group including 4 REs) is used for other downlink control channels (PCFICH and PHICH). That is, REG is used as a basic resource unit of a control region. 4 PDCCH formats are supported as shown in Table 2.

TABLE 2

| PDCCH format | Number of CCEs (n) | Number of REGs | Number of PDCCH bits |
|---|---|---|---|
| 0 | 1 | 9 | 72 |
| 1 | 2 | 8 | 144 |

TABLE 2-continued

| PDCCH format | Number of CCEs (n) | Number of REGs | Number of PDCCH bits |
|---|---|---|---|
| 2 | 4 | 36 | 288 |
| 3 | 5 | 72 | 576 |

CCEs are sequentially numbered. To simplify a decoding process, transmission of a PDCCH having a format including n CCEs can be started using as many CCEs as a multiple of n. The number of CCEs used to transmit a specific PDCCH is determined by a BS according to channel condition. For example, if a PDCCH is for a UE having a high-quality downlink channel (e.g. a channel close to the BS), only one CCE can be used for PDCCH transmission. However, for a UE having a poor channel (e.g. a channel close to a cell edge), 8 CCEs can be used for PDCCH transmission in order to obtain sufficient robustness. In addition, a power level of the PDCCH can be controlled according to channel condition.

LTE defines CCE positions in a limited set in which PDCCHs can be positioned for each UE. CCE positions in a limited set that the UE needs to monitor in order to detect the PDCCH allocated thereto may be referred to as a search space (SS). In LTE, the SS has a size depending on PDCCH format. A UE-specific search space (USS) and a common search space (CSS) are separately defined. The USS is set per UE and the range of the CSS is signaled to all UEs. The USS and the CSS may overlap for a given UE. In the case of a considerably small SS with respect to a specific UE, when some CCEs positions are allocated in the SS, remaining CCEs are not present. Accordingly, the BS may not find CCE resources on which PDCCHs will be transmitted to available UEs within given subframes. To minimize the possibility that this blocking continues to the next subframe, a UE-specific hopping sequence is applied to the starting point of the USS.

Table 3 shows sizes of the CSS and USS.

TABLE 3

| PDCCH format | Number of CCEs (n) | Number of candidates in common search space | Number of candidates in dedicated search space |
|---|---|---|---|
| 0 | 1 | — | 6 |
| 1 | 2 | — | 6 |
| 2 | 4 | 4 | 2 |
| 3 | 8 | 2 | 2 |

To control computational load of blind decoding based on the number of blind decoding processes to an appropriate level, the UE is not required to simultaneously search for all defined DCI formats. In general, the UE searches for formats 0 and 1A at all times in the USS. Formats 0 and 1A have the same size and are discriminated from each other by a flag in a message. The UE may need to receive an additional format (e.g. format 1, 1B or 2 according to PDSCH transmission mode set by a BS). The UE searches for formats 1A and 1C in the CSS. Furthermore, the UE may be set to search for format 3 or 3A. Formats 3 and 3A have the same size as that of formats 0 and 1A and may be discriminated from each other by scrambling CRC with different (common) identifiers rather than a UE-specific identifier. PDSCH transmission schemes and information content of DCI formats according to transmission mode (TM) are arranged below.

Figure 5:
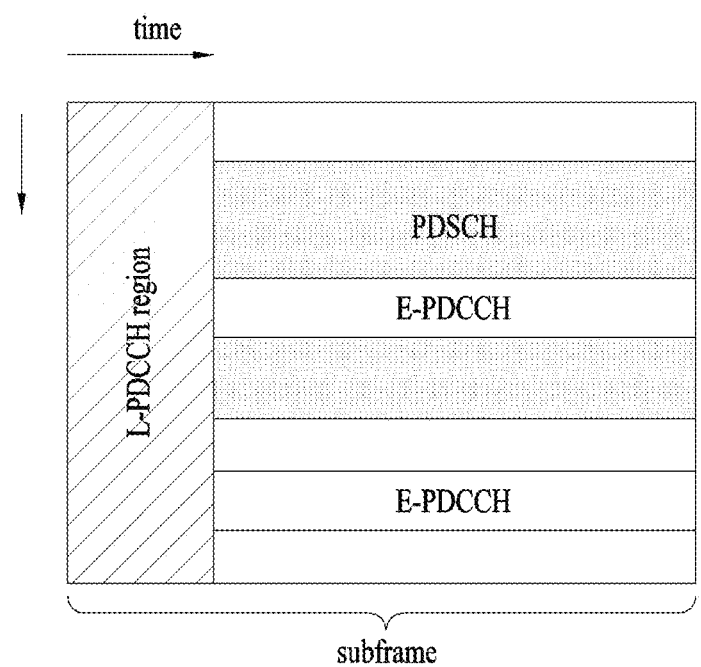
FIG. 5 illustrates an example of an Enhanced Physical Downlink Control Channel (EPDCCH).

Transmission Mode (TM)
Transmission mode 1: Transmission from a single base station antenna port
Transmission mode 2: Transmit diversity
Transmission mode 3: Open-loop spatial multiplexing
Transmission mode 4: Closed-loop spatial multiplexing
Transmission mode 5: Multi-user MIMO (Multiple Input Multiple Output)
Transmission mode 6: Closed-loop rank-1 precoding
Transmission mode 7: Single-antenna port (port5) transmission
Transmission mode 8: Double layer transmission (ports 7 and 8) or single-antenna port (port 7 or 8) transmission
Transmission mode 9: Transmission through up to 8 layers (ports 7 to 14) or single-antenna port (port 7 or 8) transmission DCI Format
Format 0: Resource grants for PUSCH transmission
Format 1: Resource assignments for single codeword PDSCH transmission (transmission modes 1, 2 and 7)
Format 1A: Compact signaling of resource assignments for single codeword PDSCH (all modes)
Format 1B: Compact resource assignments for PDSCH using rank-1 closed loop precoding (mod 6)
Format 1C: Very compact resource assignments for PDSCH (e.g. paging/broadcast system information)
Format 1D: Compact resource assignments for PDSCH using multi-user MIMO (mode 5)
Format 2: Resource assignments for PDSCH for closed-loop MIMO operation (mode 4)
Format 2A: Resource assignments for PDSCH for open-loop MIMO operation (mode 3)
Format 3/3A: Power control commands for PUCCH and PUSCH with 2-bit/1-bit power adjustments FIG. 5 illustrates an EPDCCH. The EPDCCH is a channel additionally introduced in LTE-A.

Referring to FIG. 5, a PDCCH (for convenience, legacy PDCCH or L-PDCCH) according to legacy LTE may be allocated to a control region (see FIG. 4) of a subframe. In the figure, the L-PDCCH region means a region to which a legacy PDCCH may be allocated. Meanwhile, a PDCCH may be further allocated to the data region (e.g., a resource region for a PDSCH). A PDCCH allocated to the data region is referred to as an E-PDCCH. As shown, control channel resources may be further acquired via the E-PDCCH to mitigate a scheduling restriction due to restricted control channel resources of the L-PDCCH region. Similarly to the L-PDCCH, the E-PDCCH carries DCI. For example, the E-PDCCH may carry downlink scheduling information and uplink scheduling information. For example, the UE may receive the E-PDCCH and receive data/control information via a PDSCH corresponding to the E-PDCCH. In addition, the UE may receive the E-PDCCH and transmit data/control information via a PUSCH corresponding to the E-PDCCH. The E-PDCCH/PDSCH may be allocated starting from a first OFDM symbol of the subframe, according to cell type. In this specification, the PDCCH includes both L-PDCCH and EPDCCH unless otherwise noted.

Figure 6:
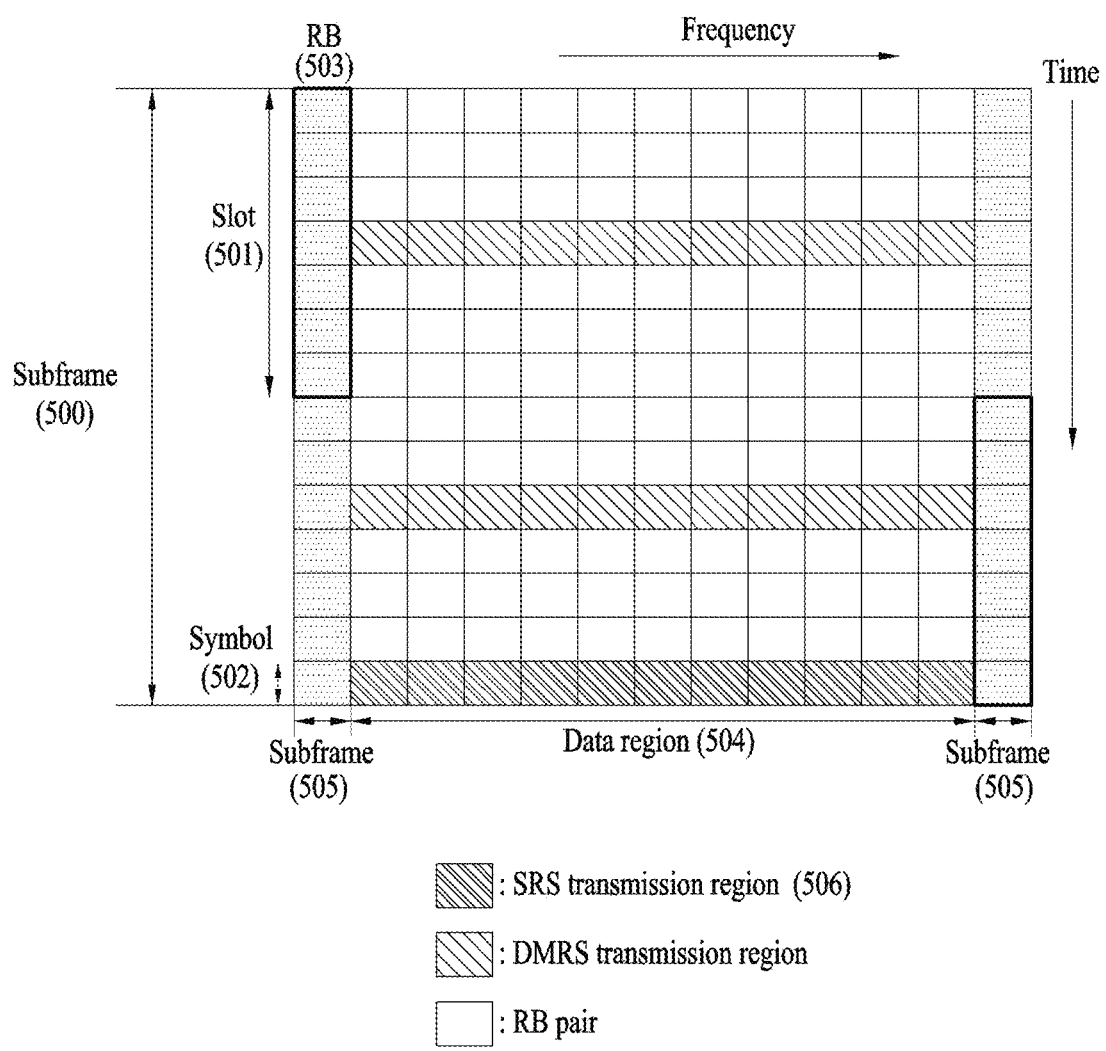
FIG. 6 illustrates the structure of an uplink subframe used in LTE(-A).

FIG. 6 illustrates a structure of an uplink subframe used in LTE(-A).

Referring to FIG. 6, a subframe 500 is composed of two 0.5 ms slots 501. Assuming a length of a normal cyclic prefix (CP), each slot is composed of 7 symbols 502 and one symbol corresponds to one SC-FDMA symbol. A resource block (RB) 503 is a resource allocation unit corresponding to 12 subcarriers in the frequency domain and one slot in the time domain. The structure of the uplink subframe of LTE(-A) is largely divided into a data region 504 and a control region 505. A data region refers to a communication resource used for transmission of data such as voice, a packet, etc. transmitted to each UE and includes a physical uplink shared channel (PUSCH). A control region refers to a communication resource for transmission of an uplink control signal, for example, downlink channel quality report from each UE, reception ACK/NACK for a downlink signal, uplink scheduling request, etc. and includes a physical uplink control channel (PUCCH). A sounding reference signal (SRS) is transmitted through an SC-FDMA symbol that is lastly positioned in the time axis in one subframe. SRSs of a plurality of UEs, which are transmitted to the last SC-FDMAs of the same subframe, can be differentiated according to frequency positions/sequences. The SRS is used to transmit an uplink channel state to an eNB and is periodically transmitted according to a subframe period/offset set by a higher layer (e.g., RRC layer) or aperiodically transmitted at the request of the eNB.

The SRS includes constant amplitude zero auto correlation (CAZAC) sequences. SRSs transmitted from several UEs are CAZAC sequences $r^{SRS}(n) = r_{u,v}^{(\alpha)}(n)$ having different cyclic shift values a according to Equation 1.

$$\alpha = 2\pi \frac{n_{SRS}^{cs}}{8}, \quad \text{[Equation 1]}$$

where $n_{SRS}^{cs}$ is a value set to each UE by a higher layer and has an integer value between 0 and 7.

CAZAC sequences generated from one CAZAC sequence through cyclic shift have zero-correlation values with sequences having different cyclic shift values. Using such property, SRSs of the same frequency domain may be divided in accordance with CAZAC sequence cyclic shift values. The SRS of each UE is allocated onto the frequency axis according to a parameter set by the eNB. The UE performs frequency hopping of the SRS so as to transmit the SRS with an overall uplink data transmission bandwidth.

In order to satisfy a transmission power $P_{SRS}$ of a UE, an SRS sequence $r^{SRS}(n)$ is first multiplied by an amplitude scaling factor $\beta_{SRS}$ and then mapped into a resource element (RE) having an index (k,l) from $r^{SRS}(0)$ by the following Equation 2.

$$a_{2k+k_0, l} = \begin{cases} \beta_{SRS} r^{SRS}(k) & k = 0, 1, \ldots, M_{sc,b}^{RS} - 1 \\ 0 & \text{otherwise} \end{cases}, \quad \text{[Equation 2]}$$

where $k_0$ denotes a frequency domain start point of the SRS, and $M_{sc,b}^{RS}$ is a length (that is, bandwidth) of a sounding reference signal sequence expressed by a subcarrier unit defined in the following Equation 3.

$$M_{sc,b}^{RS} = m_{SRS,b} N_{sc}^{RB}/2 \quad \text{[Equation 3]}$$

In the Equation 3, $m_{SRS,b}$ denotes an uplink bandwidth $N_{RB}^{UL}$ signaled from the eNB.

Figure 7:
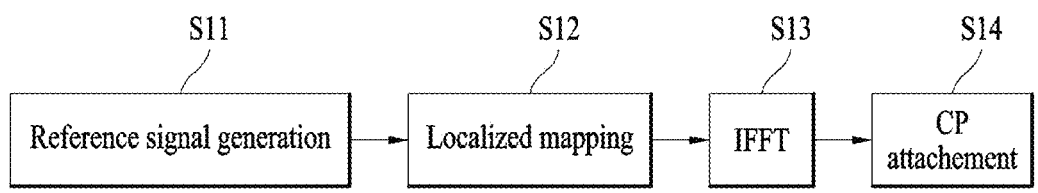
FIG. 7 illustrates a signal processing procedure for transmitting a reference signal (RS) to an uplink.

FIG. 7 illustrates a signal processing procedure for transmitting a reference signal (RS) to an uplink. Data is converted into a frequency-domain signal through a DFT precoder and then transmitted through IFFT after frequency mapping. On the other hand, an RS is transmitted without passing through the DFT precoder. Specifically, after an RS sequence is directly generated (S11) in the frequency domain, the RS is transmitted through sequential processes of localized mapping (S12), IFFT (S13), and cyclic prefix (CP) attachment (S14).

RS sequence $r_{u,v}^{(\alpha)}(n)$ is defined by a cyclic shift a of a base sequence, and may be expressed as the following Equation 4.

$$r_{u,v}^{(\alpha)}(n) = e^{j\alpha n} \bar{r}_{u,v}(n), 0 \leq n < M_{sc}^{RS}, \quad \text{[Equation 4]}$$

where $M_{sc}^{RS} = mN_{sc}^{RB}$ is a length of the RS sequence, $N_{sc}^{RB}$ is a resource block size expressed in a unit of subcarrier, and m is $1 \leq m \leq N_{RB}^{max,UL}$ denotes a maximum uplink transmission band.

Base sequences $\bar{r}_{u,v}(n)$ are divided into groups. $u \in \{0, 1, \ldots, 29\}$ denotes a group number, and v corresponds to a base sequence number within the corresponding group. Each group includes one base sequence (v=0) of length $M_{sc}^{RS} = mN_{sc}^{RB}$ ($1 \leq m \leq 5$) and two base sequences (v=0,1) of each length $M_{sc}^{RS} = mN_{sc}^{RB}$ ($6 \leq m \leq N_{RB}^{max,UL}$). Each of the sequence group number u and the corresponding number v within the corresponding group may vary depending on time. The definition of the base sequence $r_{u,v}(0), \ldots, r_{u,v}(M_{sc}^{RS}-1)$ depends on the sequence length $M_{sc}^{RS}$.

For $M_{sc}^{RS} \geq 3N_{sc}^{RB}$, the base sequence $\bar{r}_{u,v}(0), \ldots, \bar{r}_{u,v}(M_{sc}^{RS}-1)$ is given by the following Equation 5.

$$\bar{r}_{u,v}(n) = x_q(n \mod N_{ZC}^{RS}), 0 \leq n < M_{sc}^{RS}, \quad \text{[Equation 5]}$$

where a qth root Zadoff-Chu sequence may be defined by the following Equation 6.

$$x_q(m) = e^{-j\frac{\pi q m(m+1)}{N_{ZC}^{RS}}}, 0 \leq m \leq N_{ZC}^{RS} - 1, \quad \text{[Equation 6]}$$

where q satisfies the following Equation 7.

$$q = \lfloor \bar{q} + 1/2 \rfloor + v \cdot (-1)^{\lfloor 2\bar{q} \rfloor}$$

$$\bar{q} = N_{ZC}^{RS} \cdot (u+1)/31 \quad \text{[Equation 7]}$$

where the length $N_{ZC}^{RB}$ of the Zadoff-Chu sequence is given by the greatest prime number to satisfy $N_{ZC}^{RS} < M_{sc}^{RS}$.

Base sequences of length less than $3N_{sc}^{RB}$ may be defined as follows. First of all, for $M_{sc}^{RS} = N_{sc}^{RB}$ and $M_{sc}^{RS} = 2N_{sc}^{RB}$, the base sequences are given by the following Equation 8.

$$\bar{r}_{u,v}(n) = e^{j\varphi(n)\pi/4}, 0 \leq n \leq M_{sc}^{RS} - 1 \quad \text{[Equation 8]}$$

where a value of $\varphi(n)$ for $M_{sc}^{RS} = N_{sc}^{RB}$ is given by the following Table 4. A value of $\varphi(n)$ for $M_{sc}^{RS} = 2N_{sc}^{RB}$ 1 is also given by a similar Table.

TABLE 4

| U | $\varphi(0), \ldots, \varphi(11)$ |
|---|---|
| 0  | −1 |  1 |  3 | −3 |  3 |  3 |  1 |  1 |  3 |  1 | −3 |  3 |
| 1  |  1 |  1 |  3 |  3 |  3 | −1 |  1 | −3 | −3 |  1 | −3 |  3 |
| 2  |  1 |  1 | −3 | −3 | −3 | −1 | −3 | −3 |  1 | −3 |  1 | −1 |
| 3  | −1 |  1 |  1 |  1 |  1 | −1 | −3 | −3 |  1 | −3 |  3 | −1 |
| 4  | −1 |  3 |  1 | −1 |  1 | −1 | −3 | −1 |  1 | −1 |  1 |  3 |
| 5  |  1 | −3 |  3 | −1 | −1 |  1 |  1 | −1 | −1 |  3 | −3 |  1 |
| 6  | −1 |  3 | −3 | −3 | −3 |  3 |  1 | −1 |  3 |  3 | −3 |  1 |
| 7  | −3 | −1 | −1 | −1 |  1 | −3 |  3 | −1 |  1 | −3 |  3 |  1 |
| 8  |  1 | −3 |  3 |  1 | −1 | −1 | −1 |  1 |  1 |  3 | −1 |  1 |
| 9  |  1 | −3 | −1 |  3 |  3 | −1 | −3 |  1 |  1 |  1 |  1 |  1 |
| 10 | −1 |  3 | −1 |  1 |  1 | −3 | −3 | −1 | −3 | −3 |  3 | −1 |
| 11 |  3 |  1 | −1 | −1 |  3 |  3 | −3 |  1 |  3 |  1 |  3 |  3 |
| 12 |  1 | −3 |  1 |  1 | −3 |  1 |  1 |  1 | −3 | −3 | −3 |  1 |
| 13 |  3 |  3 | −3 |  3 | −3 |  1 |  1 |  3 | −1 | −3 |  3 |  3 |
| 14 | −3 |  1 | −1 | −3 | −1 |  3 |  1 |  3 |  3 |  3 | −1 |  1 |
| 15 |  3 | −1 |  1 | −3 | −1 | −1 |  1 |  1 |  3 |  1 | −1 | −3 |
| 16 |  1 |  3 |  1 | −1 |  1 |  3 |  3 |  3 | −1 | −1 |  3 | −1 |

TABLE 4-continued

| U | φ(0), . . . , φ(11) | | | | | | | | | | | |
|---|---|---|---|---|---|---|---|---|---|---|---|---|
| 17 | -3 | 1 | 1 | 3 | -3 | 3 | -3 | -3 | 3 | 1 | 3 | -1 |
| 18 | -3 | 3 | 1 | 1 | -3 | 1 | -3 | -3 | -1 | -1 | 1 | -3 |
| 19 | -1 | 3 | 1 | 3 | 1 | -1 | -1 | 3 | -3 | -1 | -3 | -1 |
| 20 | -1 | -3 | 1 | 1 | 1 | 1 | 3 | 1 | -1 | 1 | -3 | -1 |
| 21 | -1 | 3 | -1 | 1 | -3 | -3 | -3 | -3 | -3 | 1 | -1 | -3 |
| 22 | 1 | 1 | -3 | -3 | -3 | -3 | -1 | 3 | -3 | 1 | -3 | 3 |
| 23 | 1 | 1 | -1 | -3 | -1 | -3 | 1 | -1 | 1 | 3 | -1 | 1 |
| 24 | 1 | 1 | 3 | 1 | 3 | 3 | -1 | 1 | -1 | -3 | -3 | 1 |
| 25 | 1 | -3 | 3 | 3 | 1 | 3 | 3 | 1 | -3 | -1 | -1 | 3 |
| 26 | 1 | 3 | -3 | -3 | 3 | -3 | 1 | -1 | -1 | 3 | -1 | -3 |
| 27 | -3 | -1 | -3 | -1 | -3 | 3 | 1 | -1 | 1 | 3 | -3 | -3 |
| 28 | -1 | 3 | -3 | 3 | -1 | 3 | 3 | -3 | 3 | -3 | -1 | -1 |
| 29 | 3 | -3 | -3 | -1 | -1 | -3 | -1 | 3 | -3 | 3 | 1 | -1 |

A reference signal for PUSCH is determined as follows.

A reference signal sequence for $r^{PUSCH}(\cdot)$ is defined by $r^{PUSCH}(m \cdot M_{sc}^{RS}+n)=r_{u,v}^{(\alpha)}(n)$, wherein m and n satisfy $$m = 0, 1$$

$$n = 0, \ldots, M_{sc}^{RS} - 1 \ r^{PUSCH}(\cdot) \text{ and } M_{sc}^{RS} = M_{sc}^{PUSCH}.$$

Cyclic shift in one slot is given by $\alpha=2n_{cs}/12$ together with $n_{cs}=(n_{DMRS}^{(1)}+n_{DMRS}^{(2)}+n_{PRS}(n_s))$ mod 12.

$n_{DMRS}^{(1)}$ is a broadcasted value, $n_{DMRS}^{(2)}$ is given by uplink scheduling allocation, and $n_{PRS}(n_s)$ is a cell-specific cyclic shift value. $n_{PRS}(n_s)$ varies depending on a slot number $n_s$, and is given by $n_{PRS}(n_s)=\Sigma_{i=0}^{7} c(8 \cdot n_s+i) \cdot 2^i$.

c(i) is a pseudo-random sequence, and c(i) is a cell-specific value. A pseudo-random sequence generator may be reset to $$c_{init} = \left\lfloor \frac{N_{ID}^{cell}}{30} \right\rfloor \cdot 2^5 + f_{ss}^{PUSCH}$$

at the start of a radio frame.

Table 5 illustrates a cyclic shift field in a Downlink Control Information (DCI) format and $n_{DMRS}^{(2)}$.

TABLE 5

| Cyclic shift field in DCI format 0 | $n_{DMRS}^{(2)}$ |
|---|---|
| 000 | 0 |
| 001 | 2 |
| 010 | 3 |
| 011 | 4 |
| 100 | 6 |
| 101 | 8 |
| 110 | 9 |
| 111 | 10 |

A physical mapping method for an uplink RS in PUSCH is as follows.

The sequence is multiplied by an amplitude scaling factor βPUSCH and mapped into the same set of physical resource blocks (PRBs) used for a corresponding PUSCH within a sequence starting with $r^{PUSCH}(0)$. The mapping into resource elements (k,l), with l=3 for normal cyclic prefix and l=2 for extended cyclic prefix, within the subframe is performed in such a manner that the order of k is increased and then a slot number is increased.

In summary, if length is $3N_{sc}^{RB}$ or more, a ZC sequence is used with cyclic extension and, if length is less than $3N_{sc}^{RB}$, a computer generated sequence is used. A cyclic shift is determined in accordance with a cell-specific cyclic shift, a UE-specific cyclic shift and a hopping pattern.

Figure 8:
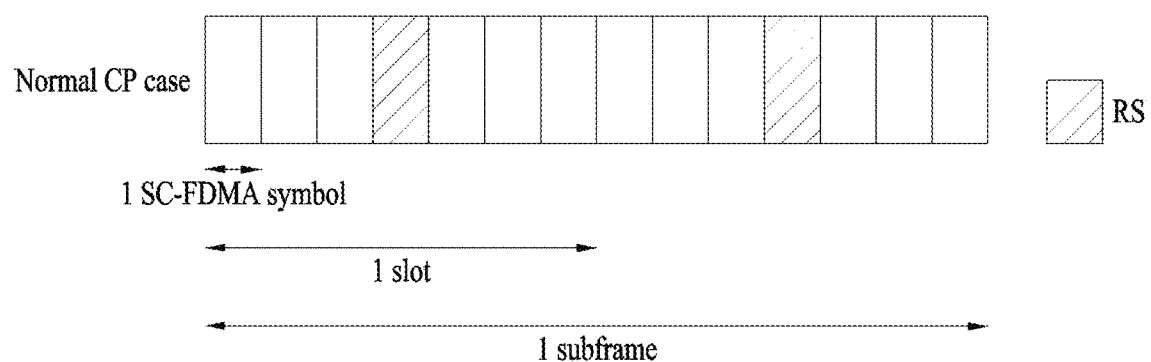
FIG. 8 illustrates a structure of a demodulation reference signal (DMRS) for a PUSCH.

FIG. 8 illustrates a structure of a demodulation reference signal (DMRS) for a PUSCH. Referring to FIG. 8, the DMRS is transmitted through fourth and eleventh SC-FDMA symbols.

Figure 9:
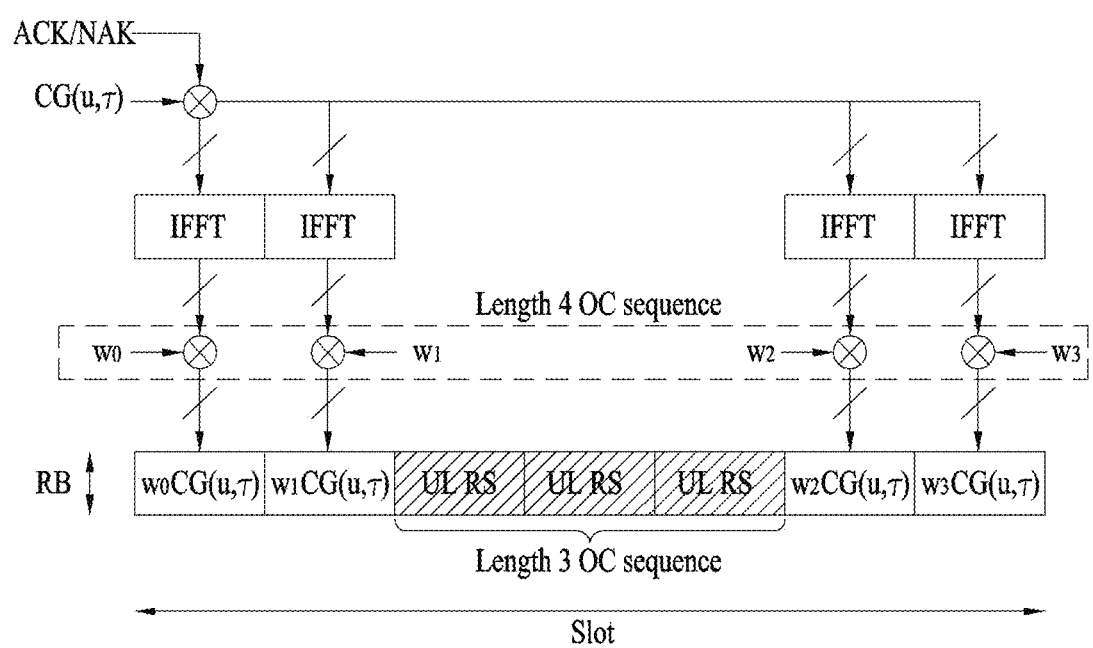
FIG. 9 illustrates a slot level structure of PUCCH formats 1a and 1b.

FIG. 9 illustrates PUCCH formats 1a and 1b in case of normal CP. The same control information is repeated on a slot basis in a subframe in PUCCH Format 1a and 1b. A UE transmits ACK/NACK signals through different resources that include different Cyclic Shifts (CSs) (frequency-domain code) of a Computer Generated-Constant Amplitude Zero Auto Correlation (CG-CAZAC) sequence and an Orthogonal Cover (OC) or Orthogonal Cover Code (OCC) (a time-domain spreading code). The OC includes, for example, a Walsh/DFT orthogonal code. If the number of CSs is 6 and the number of OCs is 3, a total of 18 UEs may be multiplexed in the same Physical Resource Block (PRB) based on a single antenna. OC sequences w0, w1, w2 and w3 are applicable to a random time domain (after FFT modulation) or to a random frequency domain (before FFT modulation). RS signal of each UE is also transmitted through different resources that include different cyclic shifts of a CG-CAZAC sequence and orthogonal cover codes w0, w1 and w2.

Length-4 and length-3 OCs for PUCCH Format 1/1a/1b are illustrated in Table 6 and Table 7 below.

TABLE 6

Length-4 orthogonal sequences for PUCCH formats 1/1a/1b

| Sequence index $n_{oc}(n_s)$ | Orthogonal sequences $[w(0) \ldots w(N_{SF}^{PUCCH} - 1)]$ |
|---|---|
| 0 | [+1 +1 +1 +1] |
| 1 | [+1 -1 +1 -1] |
| 2 | [+1 -1 -1 +1] |

TABLE 7

Length-3 orthogonal sequences PUCCH formats 1/1a/1b

| Sequence index $n_{oc}(n_s)$ | Orthogonal sequences $[w(0) \ldots w(N_{SF}^{PUCCH} - 1)]$ |
|---|---|
| 0 | [1 1 1] |
| 1 | [1 $e^{j2\pi/3}$ $e^{j4\pi/3}$] |
| 2 | [1 $e^{j4\pi/3}$ $e^{j2\pi/3}$] |

Figure 10:
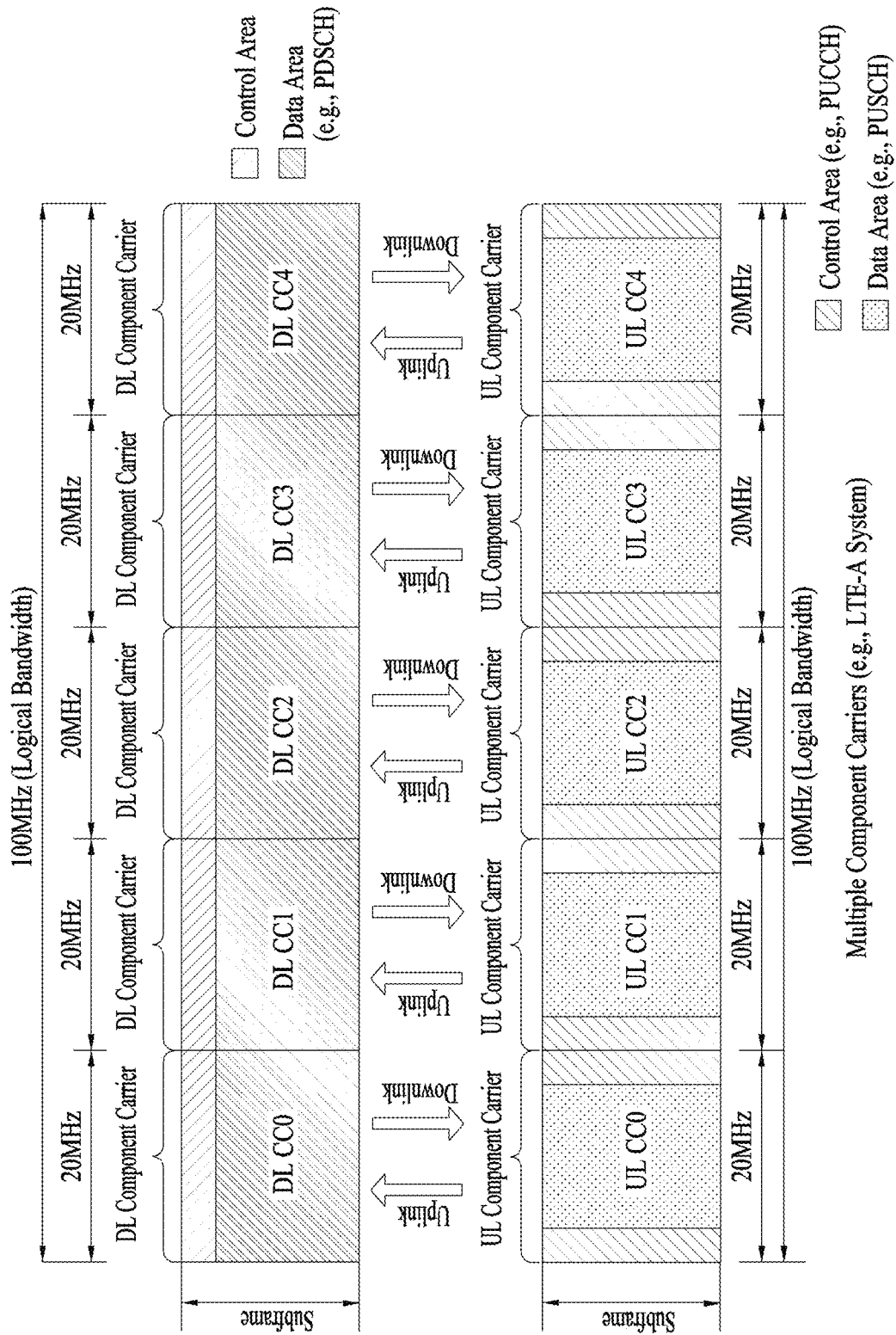
FIG. 10 illustrates a carrier aggregation (CA)-based wireless communication system.

FIG. 10 illustrates carrier aggregation (CA) communication system.

Referring to FIG. 10, a plurality of UL/DL component carriers (CCs) can be aggregated to support a wider UL/DL bandwidth. The CCs may be contiguous or non-contiguous in the frequency domain. Bandwidths of the CCs can be independently determined. Asymmetrical CA in which the number of UL CCs is different from the number of DL CCs can be implemented. Control information may be transmitted/received only through a specific CC. This specific CC may be referred to as a primary CC and other CCs may be referred to as secondary CCs. For example, when cross-carrier scheduling (or cross-CC scheduling) is applied, a PDCCH for downlink allocation can be transmitted on DL CC #0 and a PDSCH corresponding thereto can be transmitted on DL CC #2. The term "component carrier" may be replaced by other equivalent terms (e.g. "carrier", "cell", etc.).

For cross-CC scheduling, a carrier indicator field (CIF) is used. Presence or absence of the CIF in a PDCCH can be determined by higher layer signaling (e.g. RRC signaling) semi-statically and UE-specifically (or UE group-specifically). The baseline of PDCCH transmission is summarized as follows.

CIF disabled: a PDCCH on a DL CC is used to allocate a PDSCH resource on the same DL CC or a PUSCH resource on a linked UL CC.

No CIF

CIF enabled: a PDCCH on a DL CC can be used to allocate a PDSCH or PUSCH resource on a specific DL/UL CC from among a plurality of aggregated DL/UL CCs using the CIF.

LTE DCI format extended to have CIF

CIF corresponds to a fixed x-bit field (e.g. x=3) (when CIF is set)

CIF position is fixed irrespective of DIC format size (when CIF is set)

When the CIF is present, the BS may allocate a monitoring DL CC (set) to reduce BD complexity of the UE. For PDSCH/PUSCH scheduling, the UE may detect/decode a PDCCH only on the corresponding DL CCs. The BS may transmit the PDCCH only through the monitoring DL CC (set). The monitoring DL CC set may be set UE-specifically, UE-group-specifically or cell-specifically.

Figure 11:
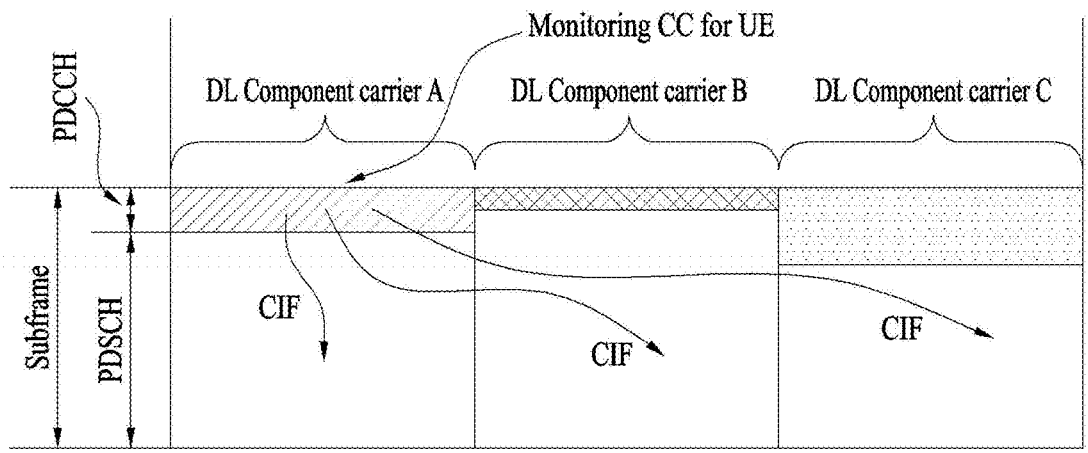
FIG. 11 illustrates cross-carrier scheduling.

FIG. 11 illustrates scheduling when a plurality of carriers is aggregated. It is assumed that 3 DL CCs are aggregated and DL CC A is set to a PDCCH CC. DL CC A~C may be referred to as a serving CC, serving carrier, serving cell, etc. When the CIF is disabled, each DL CC can transmit only a PDCCH that schedules a PDSCH corresponding to the DL CC without a CIF according to LTE PDCCH rule (non-cross-CC scheduling). When the CIF is enabled through UE-specific (or UE-group-specific or cell-specific) higher layer signaling, a specific CC (e.g. DL CC A) can transmit not only the PDCCH that schedules the PDSCH of DL CC A but also PDCCHs that schedule PDSCHs of other DL CCs using the CIF (cross-scheduling). A PDCCH is not transmitted on DL CC B and DL CC C.

Figure 12:
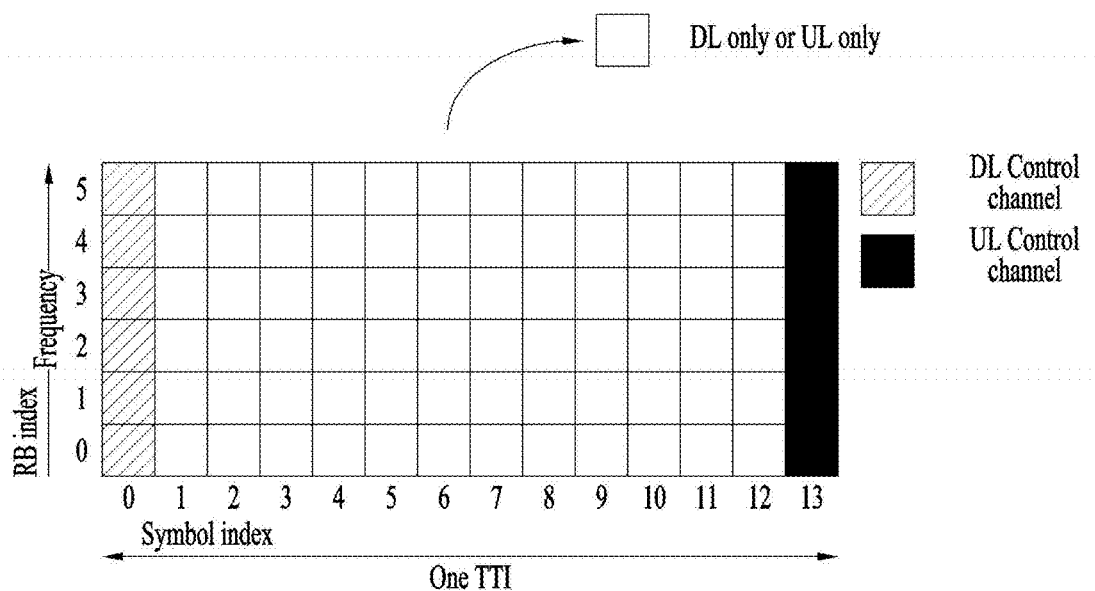
FIG. 12 illustrates a structure of a self-contained subframe.

In next-generation RAT (Radio Access Technology), a self-contained subframe is considered in order to minimize data transmission latency. FIG. 12 illustrates a self-contained subframe structure. In FIG. 12, a hatched region represents a DL control region and a black region represents a UL control region. A blank region may be used for DL data transmission or UL data transmission. DL transmission and UL transmission are sequentially performed in a single subframe, and thus DL data can be transmitted and UL ACK/NACK can also be received in a subframe. Consequently, a time taken until data retransmission is performed when a data transmission error is generated is reduced and thus final data delivery latency can be minimized.

As examples of self-contained subframe types which can be configured/set, the following four subframe types can be considered. Respective periods are arranged in a time sequence.

DL control period+DL data period+GP (Guard Period)+UL control period

DL control period+DL data period

DL control period+GP+UL data period+UL control period

DL control period+GP+UL data period

A PDFICH, a PHICH and a PDCCH can be transmitted in the data control period and a PDSCH can be transmitted in the DL data period. A PUCCH can be transmitted in the UL control period and a PUSCH can be transmitted in the UL data period. The GP provides a time gap in a process in which a BS and a UE switch from a transmission mode to a reception mode or in a process in which the BS and the UE switch from the reception mode to the transmission mode. Some OFDM symbols in a subframe at a time when DL switches to UL may be set to the GP.

Embodiment

In the legacy LTE system, a DMRS and an SRS have been introduced for estimation and sounding for an uplink (UL) radio channel. For convenience, the DMRS and the SRS will commonly be referred to URS. A method for identifying different UEs and/or antenna ports (APs) by allocating different cyclic shifts (CSs) applied to the URS on the basis of Zaddoff-Chu (ZC) sequence or CAZAC sequence (for convenience, referred to as ZC sequence) is considered. Also, in addition to the CS, a transmission comb (TC) which uses subcarriers having constant intervals (e.g., even number indexes or odd number indexes) within a given frequency domain (BW) may also be applied. As a result, a method for configuring a plurality of different URSs for a plurality of UEs and/or APs by varying a combination of CS and TC applied to the ZC sequence is considered.

Meanwhile, the length of the ZC sequence for the URS in the LTE is determined differently depending on a size of BW (hereinafter, URS BW) to which the URS is basically transmitted. In case of the DMRS, the URS BW may be a BW scheduled/allocated for transmission of a UL data channel (e.g., PUSCH). In case of the SRS, the URS BW may be a BW (e.g., $m_{SRS,b}$ of Equation 3) configured for UL channel sounding. For this reason, the URS may be configured/transmitted between the URSs having different BWs (within the same frequency resource (band)) in a non-multiplexing type. That is, FDM (which uses different bands) is only possible between the URSs having different BWs, and the URS may be configured/transmitted between the URSs having the same BW in a CS/TC based multiplexing type (within the same band) in addition to the FDM.

Meanwhile, in case of a new RAT (NR) system, a Peak-to-Average Power Ratio (PAPR) problem in UL may be relaxed due to small cell coverage and UL OFDM introduction. Considering this, the present invention suggests a method for configuring URS in an NR system more efficiently. According to the present invention, the URS may be configured/transmitted between the URSs having different BWs in an available CS/TC based multiplexing type (within the same band). For convenience of description, a pseudo random (PR) sequence or gold sequence used as a sequence for DL RS (e.g., cell-specific RS (CRS)) in the LTE is commonly referred to as the PR sequence. Also, Orthogonal Cover Code (OCC) or Walsh (Hadamard) code is commonly referred to as OCC (see Table 6). For example, the OCC may include a Discrete Fourier Transform (DFT) vector (that includes a DFT matrix) (see Table 7).

In this method, a unit frequency region for URS configuration, that is, unit BW is defined, and a sequence for configuring a URS is transmitted through the unit BW.

FIG. 13 illustrates a method for configuring a URS using a ZC sequence.

Referring to FIG. 13, the ZC sequence constituting the URS may be generated at a length corresponding to a corresponding unit BW on a unit BW basis. For example, the length of the ZC sequence may correspond to the number of subcarriers within the unit BW or a value obtained by dividing the number of corresponding subcarriers by the number of TC types (e.g., 2 if an even number or an odd number is only used). That is, one URS (transmission BW) may include a single unit BW or a plurality of unit BWs, and the ZC sequence may be generated individually per unit BW (at a length corresponding to the unit BW). Therefore, one URS may include a single ZC sequence or a plurality of ZC sequences (having a unit BW length).

In this method, one URS may be allocated as a URS for one UE or a single AP of one UE. Also, a plurality of unit BWs constituting one URS (transmission band) may be continuous (e.g., localized type (e.g., concatenated with each other)) or discontinuous (e.g., distributed type (e.g., spaced at constant intervals)) on a frequency. How many unit BWs (ZC sequences) are used to configure the URS and a type of the URS may be determined depending on (i) frequency resources scheduled/allocated for transmission of a UL data channel (e.g., PUSCH) (in case of DMRS), or (ii) frequency resources configured for UL channel sounding (in case of SRS). For example, how many unit BWs are owned by the URS (or unit BW size) may be determined based on a size of frequency resources scheduled/allocated for transmission of a UL data channel (e.g., PUSCH) or a size of frequency resources configured for UL channel sounding. For example, in the following Table 6, a system band may be replaced with the size of the frequency resources. In this case, the frequency resources for transmission of the UL data channel may be scheduled/allocated through a DL control channel (e.g., PDCCH) that includes a UL grant. Also, the frequency resources configured for UL channel sounding may be allocated semi-statically through higher layer (e.g., radio resource control (RRC)) signaling or dynamically through a DL control channel (e.g., PDCCH).

Meanwhile, in this method, in case of a CS value applied when one URS includes a plurality of unit BWs, 1) one CS may commonly be allocated to all of corresponding unit BWs, or 2) the CS may be allocated to each unit BW individually/independently (e.g., differently). Also, even in case of a TC index applied to one URS, one TC may commonly be allocated to all of a plurality of unit BWs constituting the corresponding URS, or 2) the TC may be allocated to each unit BW individually/independently (e.g., differently). Alternatively, for one URS, 1) one CS/TC combination may commonly be allocated to all of a plurality of unit BWs constituting the corresponding URS, or 2) the CS/TC combination may be allocated to each unit BW individually/independently (e.g., differently). As an example of 2), the CS value (and/or TC index) allocated to each unit BW may be determined (differently) depending on frequency resource indexes and/or AP indexes of the corresponding unit BW, and may have a pattern (e.g., CS(/TC) value is increased in accordance with increase of frequency indexes) changed (e.g., hopping) to different CS (and/or TC) values in accordance with frequency resource indexes of the unit BW. If the unit BW includes a plurality of resource units, the CS value (and/or TC index) allocated to each unit BW may be determined based on an index of a first one of a plurality of resource units constituting the corresponding unit BW.

FIG. 14 illustrates a method for configuring a URS using a PR sequence.

Referring to FIG. 14, the PR sequence may be generated 1) at a length corresponding to a specific wide BW (e.g., entire or specific part of system BW) given similarly to the case of DL RS (e.g., CRS) in the legacy LTE, or 2) at a length corresponding to a corresponding unit BW on a unit BW basis similarly to the ZC sequence. In this state, one URS (transmission BW) may include a single unit BW or a plurality of unit BWs. OCC applied to the PR sequence may be applied individually per unit BW. In this case, an OCC (sequence) length may be set to a length corresponding to a unit BW (or a length corresponding to a value obtained by dividing the corresponding length by the number of TC types) or an aliquot of the corresponding length. Also, in case of 2), the unit BW for generation of the PR sequence and the unit BW for application of OCC may be configured differently from each other. For example, the unit BW for generation of the PR sequence may be configured to be greater than the unit BW for application of OCC (in a multiple relation).

One URS configured by the PR sequence based method in accordance with the present invention may be allocated as a URS for one UE or a single AP of one UE. Also, a plurality of unit BWs constituting one URS (transmission band) may be continuous (e.g., localized type (e.g., concatenated with each other)) or discontinuous (e.g., distributed type (e.g., spaced at constant intervals)) on a frequency. How many unit BWs (OCC spreading units) are used to configure the URS and a type of the URS may be determined depending on (i) frequency resources scheduled/allocated for transmission of a UL data channel (e.g., PUSCH) (in case of DMRS), or (ii) frequency resources configured for UL channel sounding (in case of SRS). For example, how many unit BWs are owned by the URS (or unit BW size) may be determined based on a size of frequency resources scheduled/allocated for transmission of a UL data channel (e.g., PUSCH) or a size of frequency resources configured for UL channel sounding. For example, in the following Table 6, a system band may be replaced with the size of the frequency resources. In this case, the frequency resources for transmission of the UL data channel may be scheduled/allocated through a DL control channel (e.g., PDCCH) that includes a UL grant. Also, the frequency resources configured for UL channel sounding may be allocated semi-statically through higher layer (e.g., radio resource control (RRC)) signaling or dynamically through a DL control channel (e.g., PDCCH).

Meanwhile, in the PR sequence based method, in case of an OCC (sequence) index applied when one URS includes a plurality of unit BWs, 1) one OCC may commonly be allocated to all of corresponding unit BWs, or 2) the OCC may be allocated to each unit BW individually/independently (e.g., differently). Also, even in case of a TC index applied to one URS, one TC may commonly be allocated to all of a plurality of unit BWs constituting the corresponding URS, or 2) the TC may be allocated to each unit BW individually/independently (e.g., differently). Alternatively, for one URS, 1) one OCC/TC combination may commonly be allocated to all of a plurality of unit BWs constituting the corresponding URS, or 2) the OCC/TC combination may be allocated to each unit BW individually/independently (e.g., differently). As an example of 2), the OCC (and/or TC) index allocated to each unit BW may be determined (differently) depending on frequency resource indexes and/or AP indexes of the corresponding unit BW, and may have a pattern (e.g., OCC(/TC) index is increased in accordance with increase of frequency indexes) changed (e.g., hopping) to different OCC (and/or TC) indexes in accordance with frequency resource indexes of the unit BW. If the unit BW includes a plurality of resource units, the CS value (and/or TC index) allocated to each unit BW may be determined based on an index of a first one of a plurality of resource units constituting the corresponding unit BW.

In this method, in case of the unit BW, corresponding unit BW sizes may be set differently depending on type or usage (e.g., DMRS or SRS) of the URS. The unit bit size for DMRS may be set equally to an allocation unit of the UL data channel (e.g., PUSCH). For example, the unit BW size may be set to RB, RB group (RBG) or their multiple. If the unit BW size is given by RBG, the unit BW size may vary depending on a UL bandwidth. For example, the unit BW size may be given as illustrated in Table 8.

TABLE 8

| System band $N_{RB}^{UL}$ | unit BW size (P) |
|---|---|
| ≤10 | 1 |
| 11-26 | 2 |
| 27-63 | 3 |
| 64-110 | 4 |

In this case, $N^{UL}_{RB}$ is the number of RBs constituting UL band.

A root index value for generation of ZC sequence used for URS configuration or a scrambling seed value applied to the PR sequence based on the method suggested in the present invention or the other method may be determined in accordance with at least one of physical cell ID, virtual cell ID, UE-dedicated ID (e.g., C-RNTI), UE-common ID (e.g., UE-common RNTI), beam ID (or index), subframe index, slot index, symbol index, and AP index (at least one function of them).

The method suggested in the present invention is not limited to DMRS configuration for the UL data channel or SRS configuration for UL channel sounding, and may similarly be applied to a configuration of UL RS or sequence (e.g., sequence for carrying DMRS for UL control channel and/or UCI for configuring the UL control channel) of the other usage or a configuration of a specific DL RS (e.g., a DMRS for DL data channel and/or DL control channel, a specific (e.g., CSI) RS for DL channel (e.g., CSI) measurement, etc.).

Figure 15:
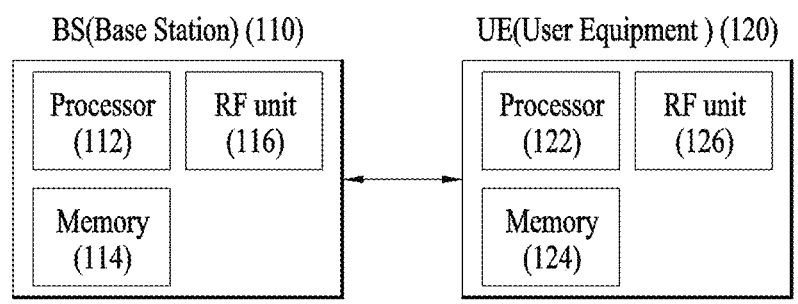
FIG. 15 illustrates a base station and a user equipment applicable to an embodiment of the present invention.

FIG. 15 illustrates a BS and a UE of a wireless communication system, which are applicable to embodiments of the present invention.

Referring to FIG. 15, the wireless communication system includes a BS 110 and a UE 120. When the wireless communication system includes a relay, the BS or UE may be replaced by the relay.

The BS 110 includes a processor 112, a memory 114 and a radio frequency (RF) unit 116. The processor 112 may be configured to implement the procedures and/or methods proposed by the present invention. The memory 114 is connected to the processor 112 and stores information related to operations of the processor 112. The RF unit 116 is connected to the processor 112 and transmits and/or receives an RF signal. The UE 120 includes a processor 122, a memory 124 and an RF unit 126. The processor 122 may be configured to implement the procedures and/or methods proposed by the present invention. The memory 124 is connected to the processor 122 and stores information related to operations of the processor 122. The RF unit 126 is connected to the processor 122 and transmits and/or receives an RF signal.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It will be obvious to those skilled in the art that claims that are not explicitly cited in each other in the appended claims may be presented in combination as an embodiment of the present invention or included as a new claim by a subsequent amendment after the application is filed.

In the embodiments of the present invention, a description is made centering on a data transmission and reception relationship among a BS, a relay, and an MS. In some cases, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'enhanced Node B (eNode B or eNB)', 'access point', etc. The term 'UE' may be replaced with the term 'Mobile Station (MS)', 'Mobile Subscriber Station (MSS)', 'mobile terminal', etc.

The embodiments of the present invention may be achieved by various means, for example, hardware, firmware, software, or a combination thereof. In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The present invention is applicable to UEs, eNBs or other apparatuses of a wireless mobile communication system.

The invention claimed is:

1. A method for transmitting an uplink (UL) signal by a user equipment (UE) in a wireless communication system, the method comprising:
   generating a sequence for UL signal transmission; and
   transmitting, based on the generated sequence, the UL signal on a plurality of frequency resource units included in a frequency band, each of the plurality of frequency resource units including a plurality of sub-carriers,
   wherein, based on the sequence being related to a first format, the generation of the sequence for the UL signal transmission comprises:

determining a plurality of cyclic shift (CS) values, one for each of the plurality of frequency resource units based on CS hopping, the CS hopping being performed based on an index of each frequency resource unit; and generating the sequence, in the first format, for plurality of frequency resource units, wherein the first format of the sequence is a single sequence which is cyclic-shifted based on the plurality of cyclic shift values determined for the plurality of frequency resource units, wherein, based on the sequence being related to a second format, the generation of the sequence for the UL signal transmission comprises:

determining a plurality of orthogonal covering codes (OCCs), one for each of the plurality of frequency resource units based on OCC index hopping, the OCC index hopping being performed based on the index of each frequency resource unit, and generating the sequence, in the second format, for plurality of frequency resource units, wherein the second format of the sequence is a single sequence which is generated based on the plurality of OCCs determined for the plurality of frequency resource units, wherein the generation of sequence in the second format comprises:

determining a first sequence; and generating a plurality of second sequences from the first sequence based on the plurality of OCCs determined for the plurality of frequency resource units, wherein the plurality of second sequences are generated by spreading the first sequence based on the OCC for each frequency resource unit.

2. The method of claim 1, wherein the first format of the sequence is related to a Zaddoff-Chu (ZC) sequence or a pseudo-random sequence, and the second format of the sequence is related to a Walsh-Hadamard code.

3. The method of claim 1, wherein the wireless communication system includes a 3rd Generation Project Partnership based wireless communication system.

4. The method of claim 1, wherein generating the sequence in the first format comprises:

obtaining a first cyclic shifted-sequence by applying a first CS value for a first frequency resource unit to a specific sequence; and obtaining a second cyclic shifted-sequence by applying a second CS value for a second frequency resource unit to the same specific sequence, wherein the first CS value is different from the second CS value.

5. The method of claim 4, wherein the first cyclic shifted-sequence and the second cyclic shifted-sequence are different from each other, as a result of applying the first CS value and the second CS value, respectively.

6. The method of claim 4, wherein the specific sequence is generated in a length corresponding to a single frequency resource unit.

7. The method of claim 4, wherein a length of each cyclic shifted-sequence corresponds to a number of the plurality of subcarriers included in a single frequency resource unit.

8. The method of claim 1, wherein the plurality of frequency resource units are separated from each other by a constant frequency interval.

9. The method of claim 1, wherein the uplink signal is related a UL control channel.

10. The method of claim 1, wherein the uplink signal includes a UL demodulation reference signal (DMRS) for a UL control channel.

11. A non-transitory processor readable medium recorded thereon program code(s) for executing the method of claim 1.

12. The method of claim 1, wherein the first format of the sequence includes a plurality of cyclic shifted-sequences which are related to CS hopping based sequence repetition.

13. The method of claim 1, wherein generating the plurality of second sequences comprises:

generating a second sequence for a first frequency resource unit based on the first sequence and a first OCC which is determined by performing the OCC index hopping based on an index of the first frequency resource unit; and generating a second sequence for a second frequency resource unit based on the first sequence and a second OCC which is determined by performing the OCC index hopping based on an index of the second frequency resource unit.

14. The method of claim 13, wherein the second sequence for the first frequency resource unit is generated by applying the first OCC to the first sequence, and the second sequence for the second frequency resource unit is generated by applying the second OCC to the first sequence.

15. A user equipment (UE) comprising:

a transmitter and a receiver; and at least one processor configured to generate a sequence for UL signal transmission, and to transmit, through the transmitter based on the generated sequence, the UL signal on a plurality of frequency resource units included in a frequency band, each of the plurality of frequency resource units including a plurality of subcarriers, wherein, based on the sequence being related to a first format, the generation of the sequence for the UL signal transmission comprises:

determining a plurality of cyclic shift (CS) values, one for each of the plurality of frequency resource units based on CS hopping, the CS hopping being performed based on an index of each frequency resource unit; and generating the sequence, in the first format, for the plurality of frequency resource units, wherein the first format of the sequence is a single sequence which is cyclic-shifted based on the plurality of cyclic shift values determined for the plurality of frequency resource units, wherein, based on the sequence being related to a second format, the generation of the sequence for the UL signal transmission comprises:

determining a plurality of orthogonal covering codes (OCCs), one for each of the plurality of frequency resource units based on OCC index hopping, the OCC index hopping being performed based on the index of each frequency resource unit, and generating the sequence, in the second format, for plurality of frequency resource units, wherein the second format of the sequence is a single sequence which is generated based on the plurality of OCCs determined for the plurality of frequency resource units, wherein the generation of sequence in the second format comprises:

determining a first sequence; and generating a plurality of second sequences from the first sequence based on the plurality of OCCs determined for the plurality of frequency resource units, wherein the plurality of second sequences are generated by spreading the first sequence based on the OCC for each frequency resource unit.

16. A device configured to control a user equipment (UE) to transmit an uplink (UL) signal in a wireless communication system, the device comprising:

- a memory configured to store instructions; and
- a processor configured to control, based on the instruction, the UE to generate a sequence for UL signal transmission; and to transmit, based on the generated sequence, the UL signal on a plurality of frequency resource units included in a frequency band, each of the plurality of frequency resource units including a plurality of subcarriers,
- wherein, based on the sequence being related to a first format, the generation of the sequence for the UL signal transmission comprises:
- determining a plurality of cyclic shift (CS) values, one for each of the plurality of frequency resource units based on CS hopping, the CS hopping being performed based on an index of each frequency resource unit; and
- generating the sequence, in the first format, for the plurality of frequency resource units, wherein the first format of the sequence is a single sequence which is cyclic-shifted based on the plurality of cyclic shift values determined for the plurality of frequency resource units,
- wherein, based on the sequence being related to a second format, the generation of the sequence for the UL signal transmission comprises:
- determining a plurality of orthogonal covering codes (OCCs), one for each of the plurality of frequency resource units based on OCC index hopping, the OCC index hopping being performed based on the index of each frequency resource unit, and
- generating the sequence, in the second format, for plurality of frequency resource units, wherein the second format of the sequence is a single sequence which is generated based on the plurality of OCCs determined for the plurality of frequency resource units,
- wherein the generation of sequence in the second format comprises:
- determining a first sequence; and
- generating a plurality of second sequences from the first sequence based on the plurality of OCCs determined for the plurality of frequency resource units,
- wherein the plurality of second sequences are generated by spreading the first sequence based on the OCC for each frequency resource unit.

* * * * *